United States Patent

Davidson et al.

[15] 3,660,822

[45] May 2, 1972

[54] VARIABLE BREAKDOWN STORAGE CELL WITH NEGATIVE RESISTANCE OPERATING CHARACTERISTIC

[72] Inventors: Evan E. Davidson, Wappingers Falls; Richard L. Moore, Liverpool, both of N.Y.

[73] Assignee: International Business Machines Corporation, Armonk, N.Y.

[22] Filed: Dec. 15, 1969

[21] Appl. No.: 885,152

[52] U.S. Cl. ....................340/173 NR, 307/252 R, 307/289, 307/299, 317/235 AB, 340/173 FF

[51] Int. Cl. ....................G11c 11/40, H03k 17/24

[58] Field of Search....................340/173 NR, 173 LS, 173 FF, 340/173 PE; 307/252 R, 289, 299 A; 317/235 UA, 235 AB

[56] References Cited

UNITED STATES PATENTS

| | | | |
|---|---|---|---|
| 3,218,613 | 11/1965 | Gribble | 340/173 PE |
| 3,261,985 | 7/1966 | Somos | 317/235 |

OTHER PUBLICATIONS

Davidson, Dual Emitter Avalanche Transistor Memory Array, IBM Technical Disc. Bul., Vol. 11 No. 11, April 1969, pp. 1436, 1437

Tsui, Monolithic Matrix, IBM Tech. Disc, Bul., Vol. 13 No. 2, 10/1968, pp. 443 pp. 486,487

Schuenemann, Storage Natrix, IBM Tech. Disc. Bul., Vol. 11 No. 5, 10/68, 340/173 State, pp.443

*Primary Examiner*—Stanley M. Urynowicz, Jr.
*Assistant Examiner*—Stuart Hecker
*Attorney*—Hanifin and Jancin and James E. Murray

[57] ABSTRACT

This application discloses a storage cell which employs a single gated multi-emitter semiconductor device that exhibits a negative resistance operating characteristic. The semiconductor device is biased to have two stable operating states on this negative resistance characteristic and is addressed by a word line connected to one of its emitters and a bit line connected to the other of its emitters. A parasitic transistor is formed by the two emitters and the gating layer of the semiconductor device. By application of half-select pulses to the word and bit lines, the parasitic transistor is broken down to cause a temporary current flow in the gating region of the semiconductor device. While this current flows in the gating region, the operating characteristic of the semiconductor device is changed so that there is only one stable operating state for the semiconductor device. The operation of the semiconductor device therefore shifts to this single operating state. When the temporary current flow ends the semiconductor device will be in a low voltage, high current stable state along the negative resistance characteristic irrespective of the operating state of the semiconductor device prior to the application of the half select pulses. When such a storage cell is manufactured in monolithic form, very high cell densities and extremely high operating speeds are obtainable.

4 Claims, 7 Drawing Figures

PATENTED MAY 2 1972 3,660,822

INVENTORS
EVAN E. DAVIDSON
RICHARD L. MOORE

BY James E. Murray
ATTORNEY

VARIABLE BREAKDOWN STORAGE CELL WITH NEGATIVE RESISTANCE OPERATING CHARACTERISTIC

BACKGROUND OF THE INVENTION

This invention relates to bi-stable circuits and more particularly to storage cells applicable for use in monolithic memories.

Three characteristics are very desirable in monolithic memory arrays. One of these characteristics is a high cell density on the monolithic chips making up the memory array. Another desirable characteristic of such monolithic memories is that they operate very fast, or, more explicitly, that the information stored in the storage cells of the memory be rapidly read out and new data written into the cells at high speed. A final characteristic desirable in monolithic memories is that the power dissipated by the storage cells of the memory be small, or in other words, heat generated in the storage cells by operation of the memory be minimal.

SUMMARY OF THE INVENTION

In accordance with the present invention, a storage cell for a monolithic memory is provided which requires very little area when formed on a monolithic chip, can be rapidly accessed for reading and writing and dissipates very little power during the operation of the memory. This storage cell comprises a single gated multi-emitter semiconductor device which exhibits an operating characteristic that is changeable by the application of current to the gating region of the device. This semiconductor device is normally biased so that it has two stable operating states along a negative resistance operating characteristic. The cell is accessed by a word line connected to one of the emitters and a bit line connected to the other of the emitters. When concurrent half-select pulses are applied to the word and bit lines, a parasitic transistor formed between the two emitters of the semiconductor device and including the gating region of the semiconductor device is broken down and current temporarily flows through the gating region. This current causes a change in the operating characteristic of the semiconductor device so that the semiconductor device has only one stable operating state. The operation of the semiconductor device then switches to the one stable operating state and when the temporary current flow ends the semiconductor device will be in a low voltage high current stable state along the negative resistance characteristic irrespective of the operating state of the semiconductor device prior to the application of the half-select pulses.

Therefore, it is an object of this invention to provide a storage cell which takes up very little space on the monolithic chip.

A second object of the invention is to provide a storage cell which can be rapidly accessed for reading and/or writing.

A third object of the invention is to provide a storage cell which dissipates very little energy.

Another object of the invention is to provide a storage cell which operates on the negative resistive characteristic of the single semiconductor device.

DESCRIPTION OF THE DRAWING

These and other objects, features and advantages of the invention will be apparent from the following more particular description of a preferred embodiment of the invention as illustrated in the accompanying drawings of which:

FIG. 1 illustrates the grounded emitter characteristics of a bi-polar transistor. The three curves 10, 12 and 14 show the change in collector current with variation of collector to emitter voltages of three different base currents. Use of a positive base current results in the linear operating curve 14. However, as base current is reduced to zero and goes negative, a negative resistance region occurs as shown in curves 10 and 12 in which the peak collector to emitter voltage $V_{CEmax}$ increases with more negative base current until the curve 10 is reached where a base to emitter punch-through occurs. After this punch-through occurs, any further increase in negative base bias does not create further increase in collector to emitter potentials.

Figure 1:
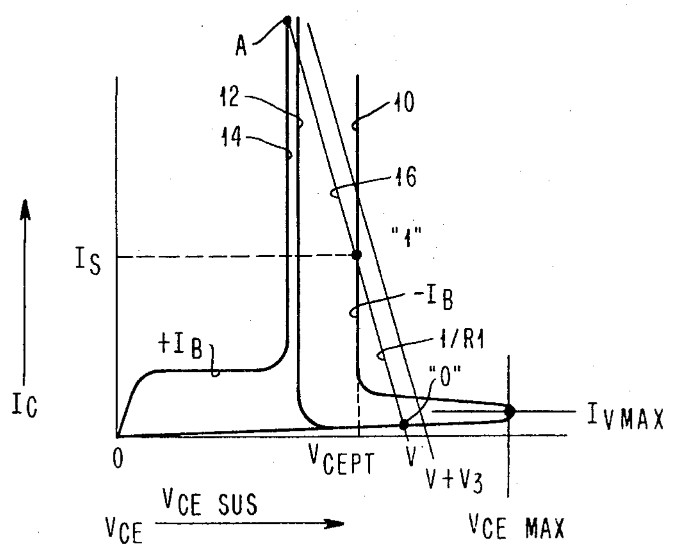
FIG. 1 is a graph showing how the operating characteristic of a transistor varies as a function of base current.
Figure 2:
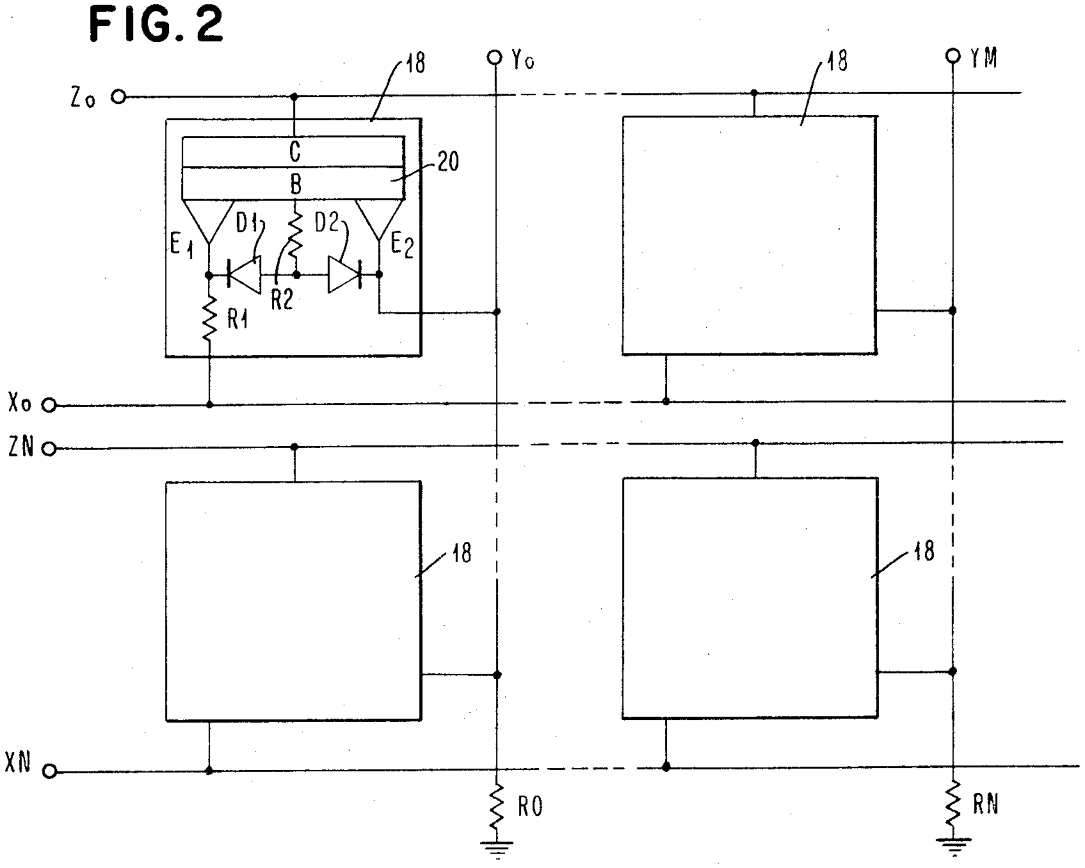
FIG. 2 is a schematic of a monolithic memory array fabricated in accordance with the present invention.

By properly placing a load line 16 on the negative resistance characteristic 10, a two state memory cell can be devised. Such a cell is shown in FIG. 2 as the memory cells 18 in a monolithic array accessed by word write lines $X_o$ through $X_n$, word read lines $Z_o$ through $Z_n$ and bit lines $Y_o$ through $Y_m$. Each of the cells 18 contains a multi-emitter transistor 20 with its collector connected to a word read line and one emitter connected to a word write line and the other emitter coupled to a bit line. The emitter $E_2$ is connected directly to the bit line $Y_o$ while the emitter $E_1$ is connected through the load resistance $R_1$ to the word write line $X_o$. Connected between the emitters E1 and E2 is biasing circuit for biasing the base B of the transistor 20. This biasing circuit consists of two back-to-back diodes D1 and D2 between emitters E1 and E2 and a resistance R2 joining the common terminals D1 and D2 to the base B. The transistor 20 is biased for bi-stable operation along its negative resistance characteristic 10 by the potential +V, the resistance R1 and negative base current supplied through the described biasing circuit so that there exists two stable operating states referred to as the "0" and "1" states in FIG. 1.

While the storage cell 18 is storing information, the $X_o$ word line is maintained at ground potential while the $Y_o$ bit line is maintained at a potential +V2 above ground causing emitter E1 to conduct and emitter E2 to be back biased. This assures that the storage cell 18 will be in either the "1" or "0" operating states shown in FIG. 1 since the current will flow from the collector terminal through emitter terminal E1 and the load resistance R1 to the $X_o$ word line. The potential difference V–V2 between the collector and the emitter E2 of transistor 20 is below $V_{sus}$ for the transistor 20. Thus if conduction were to occur through emitter E2 it would be insufficient to sustain the transistor 20 in its "1" stable state.

Assume now that a "1" is to be written into the cell and that the storage cell is initially in the "0" operating state. Then, the potential on the $X_o$ word line is raised to +V1 while potential on the $Y_o$ bit line is reduced to –V3. This causes temporary conduction to occur between emitters E1 and E2 as a result of break-down in a lateral parasitic transistor consisting of emitter regions E1 and E2 and the base region B. When this temporary conduction occurs, positive current flows in the base B cancelling the negative current flowing through the base and resistor R2. The operation of transistor 20 then switches from curve 10 to curve 14 in FIG. 1 so that the transistor 20 is no longer stable at the "0" point on the load line 16. Therefore, conduction shifts to point A on the curve, the only stable point on the load line 16.

Figure 3:
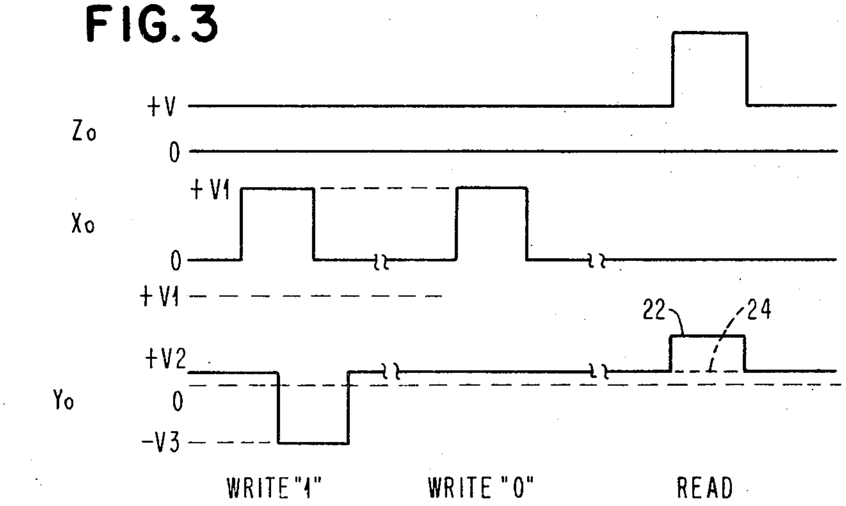
FIG. 3 is a graph of potentials employed in accessing the storage cell of FIG. 2.

After the coincident half-select voltages subside to their quiescent values, the operation of the transistor 20 returns to curve 10. The cell then operates at the "1" operating state on curve 10 since the potential V is sufficient to exceed the minimum potential $V_{CEPT}$ along the load line. Therefore the cell stores a "1". If the cell has been initially in its "1" operating state it would have remained there after the word line and bit line were driven by the +V1 and –V3 half-select coincident pulses shown in FIG. 3.

Assume now that a "1" is stored in the storage cell 18 and it is desirable to write a "0" into the storage cell. Then the $X_o$ word line is pulsed with a +V1 voltage. This reduces the collector current Ic flow through transistor 20 below the current at the voltage $V_{CEsus}$ causing the operating point of the transistor to move below this sustaining voltage. The $Y_o$ word emitter E2 does not have to be pulsed since as pointed out previously V–V2 is below the sustaining level of the transistor 20. When the write "0" pulse subsides, the transistor 20 will be operating at its "0" stable state since the potential +V is not sufficient to cause the transistor to operate beyond $V_{CEmax}$ on the 1/R1 load line. If the transistor 20 had been operating at the "0" point on the load line 16 when the write "0" pulses were applied to the $X_o$ word line it would still be operating there after the write "0" pulses end.

Therefore it can be seen that the transistor 20 has two stable states and can be switched between the two stable states at will by half-select potentials applied to the emitters E1 and E2. For this reason, binary data can be stored in any location 0,0 to M,N of the memory by the proper selection of one of the bit lines $Y_o$ to $Y_m$ and one of the word lines $X_o$ to $X_m$.

Data can be read out of the storage cell by raising the potential on the $Z_o$ word read line sufficiently to cause both emitters E1 and E2 to conduct. If a "1" is stored in the cell, the collector current conduction through transistor 20 is heavy. This heavy conduction of transistor 20, which during read passes through resistor $R_o$ produce a large read pulse 22 on the $Y_o$ bit line that can be sensed by a sense amplifier. If a "0" is stored in the storage cell, significantly less current passes through the transistor 20 so that during read time this current produces a significantly smaller voltage 24 across resistor $R_o$. The difference in magnitude between the pulses 22 and 24 is easily detected by sense amplifier. Since operation of the transistor during readout is in the avalanche mode very rapid charging of the $Z_o$ line capacitances occur and therefore short readout times are accomplished.

Due to the fact that resistance R1 is not in the readout path when data in the storage cell is being read, the resistance R1 may be selected with respect to the sense resistance $R_o$ so as to provide bi-level powering of the storage cell. The resistor $R_1$ is selected to be significantly larger than the resistor $R_o$. Therefore considerably less current flows through resistor $R_1$ than resistor $R_o$ while information is being read out of the storage cell. This provides a large read signal while at the same time reduces power consumption of the storage cell while the cell is not being accessed.

As we mentioned previously, a bias network consisting of diodes D1 and D2 and resistor R2 is connected between the emitters E1 and E2 and the base of transistor 20. The purpose of the circuit is to leak charge off the base B of the transistor 20. This leakage current is the negative current that biases transistor 20 on negative resistance curve 10. Furthermore, the leakage current prevents charges from building up across the base to collector capacitance $C_{BC}$ to cause the transistor 20 to switch states in response to noise signals on the word and bit lines. The diodes D1 and D2 are included in the circuit to prevent positive current flow into the base through resistor R2. These diodes D1 and D2 are backbiased by addressing pulses on the word and bit lines. A half select signal will not trigger a change in state of the cell 18. In the forward bias direction the voltage drop across diodes D1 and D2 is selected to be about 0.4 volts as compared to the base to emitter drop of about 0.7 volts for the transistor 20. This assures that the voltage drops across resistor R2 and diodes D1 and D2 produced by the leaking base charge will not cause the base to emitter junctions of transistor 20 to conduct and therefore cause spurious signals.

Figure 4:
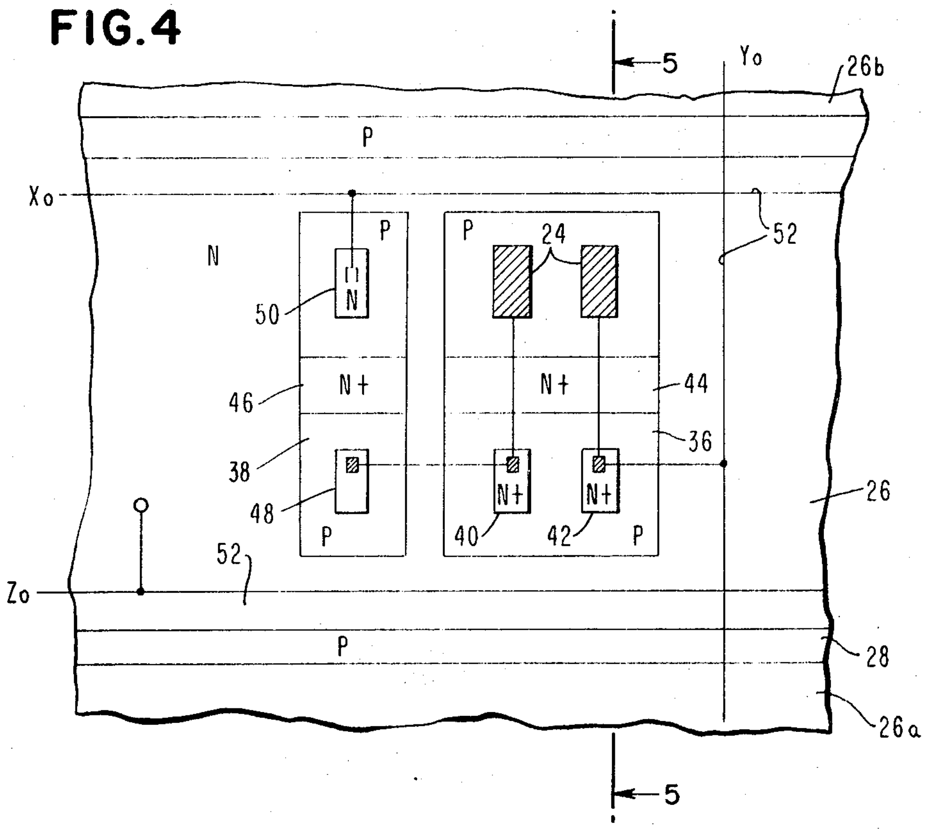
FIG. 4 is a plan view of one monolithic form of the present invention.
Figure 5:
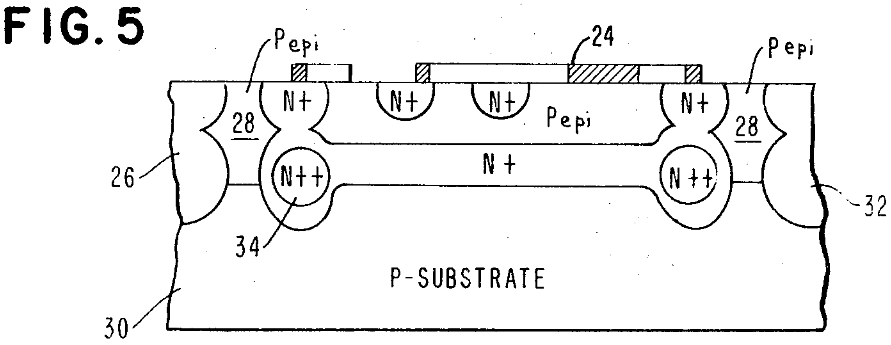
FIG. 5 is a sectional view taken along line 5—5 of FIG. 4.

The diodes D1 and D2 can be fabricated as Schottky diodes 24 in the monolithic form of the cell shown in FIGS. 4 and 5. As shown in those figures a channel 26 of N+ type material is formed by diffusion in a P epitaxial layer 28 grown on a P– type substrate 30. In this channel 26 all the storage cells on one word line are formed. Parallel channels 26a and 26b contain the storage cells of other word lines of the memory.

The fabrication of the storage cells is accomplished by first diffusing a subchannel 32 into the substrate 30 along the length of the channel 26 with an N+ arsenic diffusion. An N++ phosphorous diffusion 34 is placed along the periphery of the arsenic diffusion to diffuse the common collector region for all the transistors in the channel and the epitaxial layer 28 is grown on top of the subchannel diffusions and the subchannel diffusions 32 and 34 up diffuse into the epitaxial region. The phosphorous diffuses faster than the arsenic producing the dogbone cross section in FIG. 5. A final N+ phosphorous diffusion is now made. This final diffusion completes the collector areas of the transistor. For each transistor 20, there is a larger 36 and smaller 38 region of P EPI material in the N channel 26. In the larger region 36, two emitter areas 40 and 42 and a dumbell resistance strip 44 are diffused with this final diffusion. While the final diffusion into the small P region 38 produces a dumbell resistance strip 46 and two contact areas 48 and 50. The metal Schottky diodes 24 are then placed on the larger P region 30 and appropriate metallization connections 50 are placed between the various diffusions to the bit and word lines. The smaller P region 30 then serves as resistance R1 while the Schottky barrier diode serves as diodes D1 and D2 and the dumbell resistance between sections of the large P diffusion serves as resistance R2.

Figure 6:
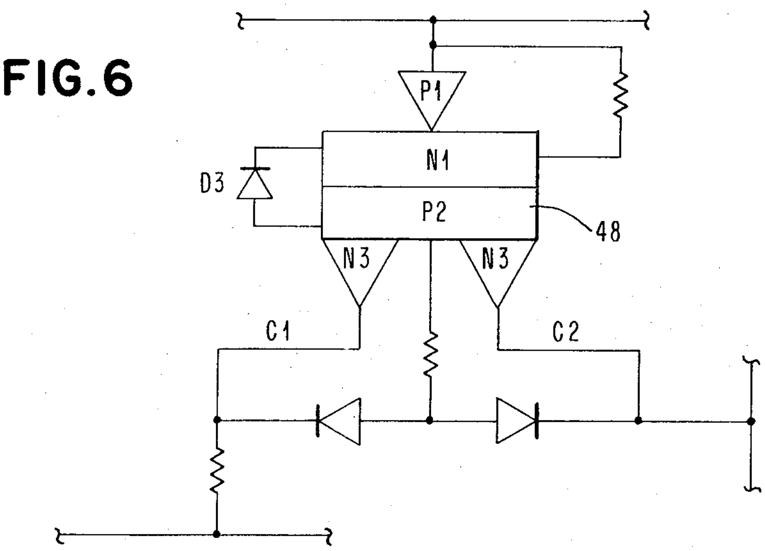
FIG. 6 is a schematic of a second storage cell employing the present invention.
Figure 7:
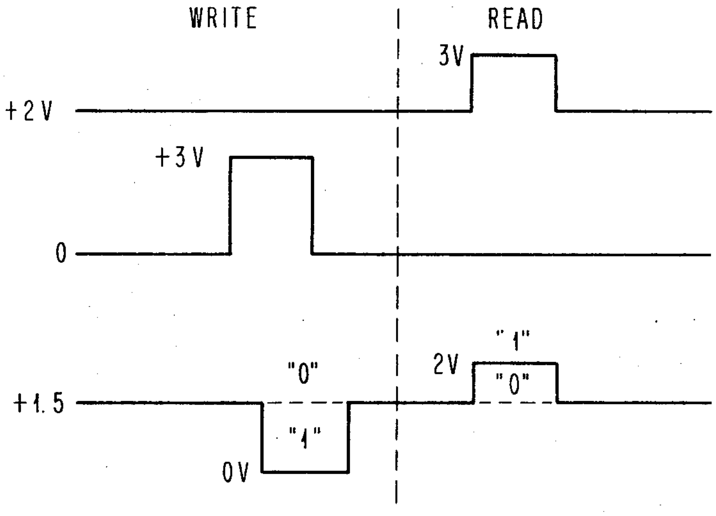
FIG. 7 is a graph of the potentials used to access the storage cell of FIG. 6 for reading and writing.

Up to now we have discussed the invention as it applies to a transistor 20. The invention can also be used using a silicon control rectifier 48 as shown in FIG. 6. This cell is accessed by reading and writing potentials as illustrated in FIG. 7. The cell is more completely described in copending application, Ser. No. 885,153 filed on even date herewith (Dec. 15, 1969).

While the invention has been particularly shown and described with reference to preferred embodiments thereof, it will be understood by those skilled in the art that various changes in form and details may be made therein without departing from the spirit and scope of the invention.

What is claimed is:

1. In a memory with storage cells addressed by word and bit lines, the improvement comprising a new storage cell including:

a multi-emitter gated semiconductor device exhibiting an operating characteristic changeable by the application of current to the gating region of the device and having emitter regions in the gating region so that the emitter regions with the gating region form a transistor, one of said emitter regions being coupled to a word line and another emitter region being coupled to a bit line;

load means for biasing said semiconductor device so that the semiconductor device operates along a negative resistance operating characteristic of said device and has two stable operating states along said negative resistance operating characteristic, the first state a high voltage low current state and the second state a low voltage high current state;

bias means for coupling the base of said multi-emitter gated semiconductor device to the emitters of said semiconductor device so as to bias the semiconductor device to operate on said negative resistance characteristic, and;

means for application of half-select pulses to both the word line and bit line which upon simultaneous application to the emitters of said semiconductor devices causes conduction of said transistor from emitter-to-emitter to inject current into the gating region of the semiconductor device to temporarily change the operation of said semiconductor device from said negative resistance characteristic to a second operating characteristic so that the semiconductor device is switched from the first stable state to the second stable state when operation of the semiconductor device returns to operation along said negative resistance operating characteristic at the end of the half-select pulses.

2. The storage cell of claim 1 wherein said multi-emitter semiconductor device is a multi-emitter transistor.

3. The storage cell of claim 2 wherein said bias means is a unidirectional current path means for discharging the base-collector junction of the multi-emitter transistor.

4. The storage cell of claim 3 said unidirectional current path means comprises two diodes coupled back to back between said emitters and resistor coupling the common terminals of the back to back diodes to the base of the transistor.

* * * * *